(12) United States Patent
Hartelius

(10) Patent No.: US 11,925,838 B1
(45) Date of Patent: Mar. 12, 2024

(54) PLAY BALL WITH FOAM FILLING

(71) Applicant: Mark Hartelius, Chicago, IL (US)

(72) Inventor: Mark Hartelius, Chicago, IL (US)

( * ) Notice: Subject to any disclaimer, the term of this patent is extended or adjusted under 35 U.S.C. 154(b) by 963 days.

(21) Appl. No.: 16/396,600

(22) Filed: Apr. 26, 2019

Related U.S. Application Data

(62) Division of application No. 15/011,540, filed on Jan. 30, 2016, now Pat. No. 10,286,259.

(60) Provisional application No. 62/212,357, filed on Aug. 31, 2015.

(51) Int. Cl.
| | | |
|---|---|---|
| *A63B 37/06* | (2006.01) | |
| *A01K 15/02* | (2006.01) | |
| *A63B 37/14* | (2006.01) | |
| *B29C 65/02* | (2006.01) | |
| *B29C 65/48* | (2006.01) | |
| *B29K 621/00* | (2006.01) | |
| *B29K 623/00* | (2006.01) | |
| *B29L 31/52* | (2006.01) | |
| *B29L 31/54* | (2006.01) | |

(52) U.S. Cl.
CPC ............ *A63B 37/06* (2013.01); *A01K 15/025* (2013.01); *A63B 37/14* (2013.01); *B29C 65/02* (2013.01); *B29C 65/48* (2013.01); *A63B 2037/065* (2013.01); *B29K 2621/00* (2013.01); *B29K 2623/083* (2013.01); *B29K 2715/006* (2013.01); *B29L 2031/5209* (2013.01); *B29L 2031/529* (2013.01); *B29L 2031/548* (2013.01)

(58) Field of Classification Search
CPC .......... A63B 2037/065; A63B 2102/02; A63B 37/06; A63B 37/14; A01K 15/025; A01K 15/026

USPC ............................ 119/707, 709, 711; 446/34
See application file for complete search history.

(56) References Cited

U.S. PATENT DOCUMENTS

| | | | |
|---|---|---|---|
| 4,229,401 A | 10/1980 | Pocklington | A63B 37/0097 156/228 |
| 4,318,875 A | 3/1982 | Shrimpton et al. | |
| 4,340,222 A | 7/1982 | Kerkenbush | A63B 41/10 264/328.1 |
| 4,674,170 A | 6/1987 | Hubbert | A63B 37/02 264/129 |
| 4,840,378 A | 6/1989 | Molitor | A63B 37/00 473/600 |
| 5,018,450 A | 5/1991 | Smith | F42B 12/40 102/498 |

(Continued)

FOREIGN PATENT DOCUMENTS

| | | |
|---|---|---|
| CN | 202682703 | 1/2013 |
| DE | 2911430 | 9/1980 |

(Continued)

*Primary Examiner* — Yvonne R Abbott-Lewis
(74) *Attorney, Agent, or Firm* — Robert W. J. Usher

(57) ABSTRACT

A play ball has a rubber shell filled with resilient foam having an entire outer peripheral surface thereof intimately attached by heat fusion and adhesive to an entire interior surface of the shell. Such attachment enables the foam to provide additional resiliency by foam tension, as well as by foam compression, thereby significantly extending the effective bounce life of the ball. A seamed dog chew toy has essentially similar construction such that the increased retention force provided by the intimate attachment of the foam to the shell resists the chewing force of the dog popping a seam improving durability.

10 Claims, 7 Drawing Sheets

(56) References Cited

U.S. PATENT DOCUMENTS

| | | | |
|---|---|---|---|
| 5,104,126 A | 4/1992 | Gentiluomo | A63B 37/0003 473/370 |
| 5,201,523 A | 4/1993 | Miller | B29C 45/14819 473/378 |
| 5,225,258 A | 7/1993 | Nakamura et al. | |
| 5,306,001 A | 4/1994 | Shishido | A63B 41/00 473/604 |
| 5,558,325 A | 9/1996 | Hargis et al. | |
| 5,688,192 A | 11/1997 | Aoyama | A63B 37/0003 473/369 |
| 6,030,304 A | 2/2000 | Simonutti et al. | |
| 6,056,842 A | 5/2000 | Dalton | A63B 45/00 156/243 |
| 6,336,871 B1 | 1/2002 | Ihara | A63B 37/0003 473/367 |
| 6,369,125 B1 | 4/2002 | Nesbitt | A63B 37/12 473/354 |
| 6,719,653 B1 | 4/2004 | Nesbitt | A63B 37/02 473/600 |
| 6,855,071 B2 | 2/2005 | Endo | A63B 37/0003 473/355 |
| 7,211,012 B2 | 5/2007 | Laliberty | A63B 37/06 473/601 |
| 7,244,802 B2 | 7/2007 | Dewanjee | A63B 37/0003 473/374 |
| 7,927,235 B2 | 4/2011 | Yokota | A63B 37/0004 473/409 |
| 7,985,779 B2 | 7/2011 | Vieghert et al. | |
| 8,220,418 B1 * | 7/2012 | Tsengas | A01K 15/025 119/707 |
| 8,920,262 B2 | 12/2014 | Kabeshita | A63B 37/004 473/376 |
| 8,974,329 B2 | 3/2015 | Laliberty | A63B 41/08 156/147 |
| 9,005,053 B2 | 4/2015 | Sullivan | A63B 37/0058 473/376 |
| 9,011,275 B2 | 4/2015 | Hebert | A63B 37/0003 473/378 |
| 9,132,317 B2 | 9/2015 | Tutmark | A63B 37/0019 |
| 9,345,234 B2 * | 5/2016 | Curry | A01K 15/025 |
| 10,051,838 B2 * | 8/2018 | Stone | A01K 15/025 |
| 2009/0199784 A1 * | 8/2009 | Oblack | A01K 15/025 119/707 |
| 2009/0318251 A1 | 12/2009 | Limerkines et al. | |
| 2010/0186682 A1 * | 7/2010 | Myers, Jr. | A01K 15/026 119/707 |
| 2010/0261563 A1 | 10/2010 | Verbeke et al. | |
| 2011/0017148 A1 * | 1/2011 | Tsengas | A01K 15/025 119/707 |
| 2012/0145091 A1 * | 6/2012 | Wang | A01K 15/026 264/45.3 |
| 2013/0000563 A1 * | 1/2013 | Shen | A01K 15/025 156/77 |
| 2015/0114309 A1 * | 4/2015 | Davison, III | A01K 15/026 119/709 |
| 2021/0245014 A1 * | 8/2021 | Simonutti | A63B 39/00 |

FOREIGN PATENT DOCUMENTS

| | | | |
|---|---|---|---|
| GB | 2008954 | | 6/1979 |
| JP | 2008132300 A | * | 6/2008 |
| KR | 200100002975 | | 1/2001 |

* cited by examiner

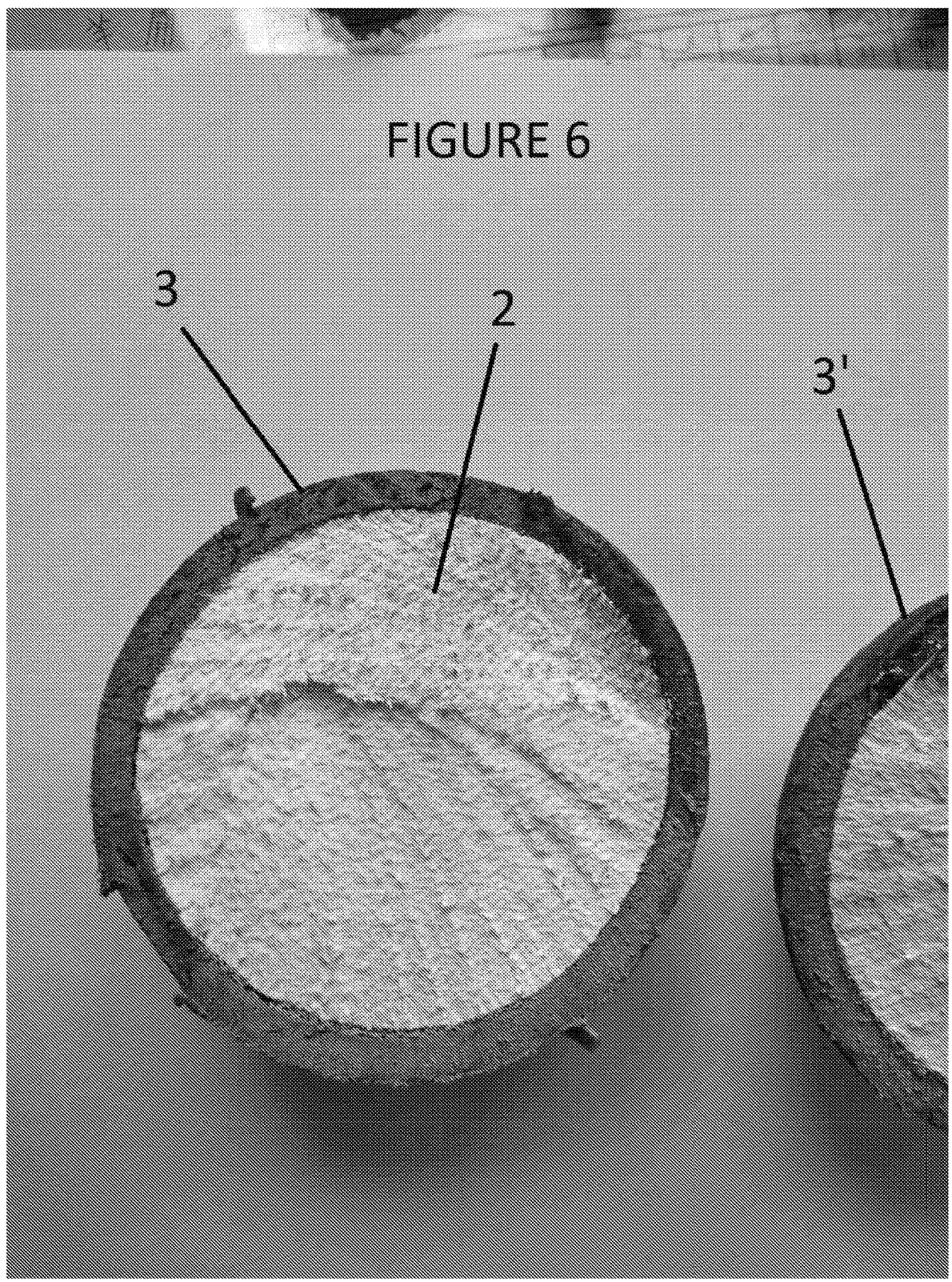

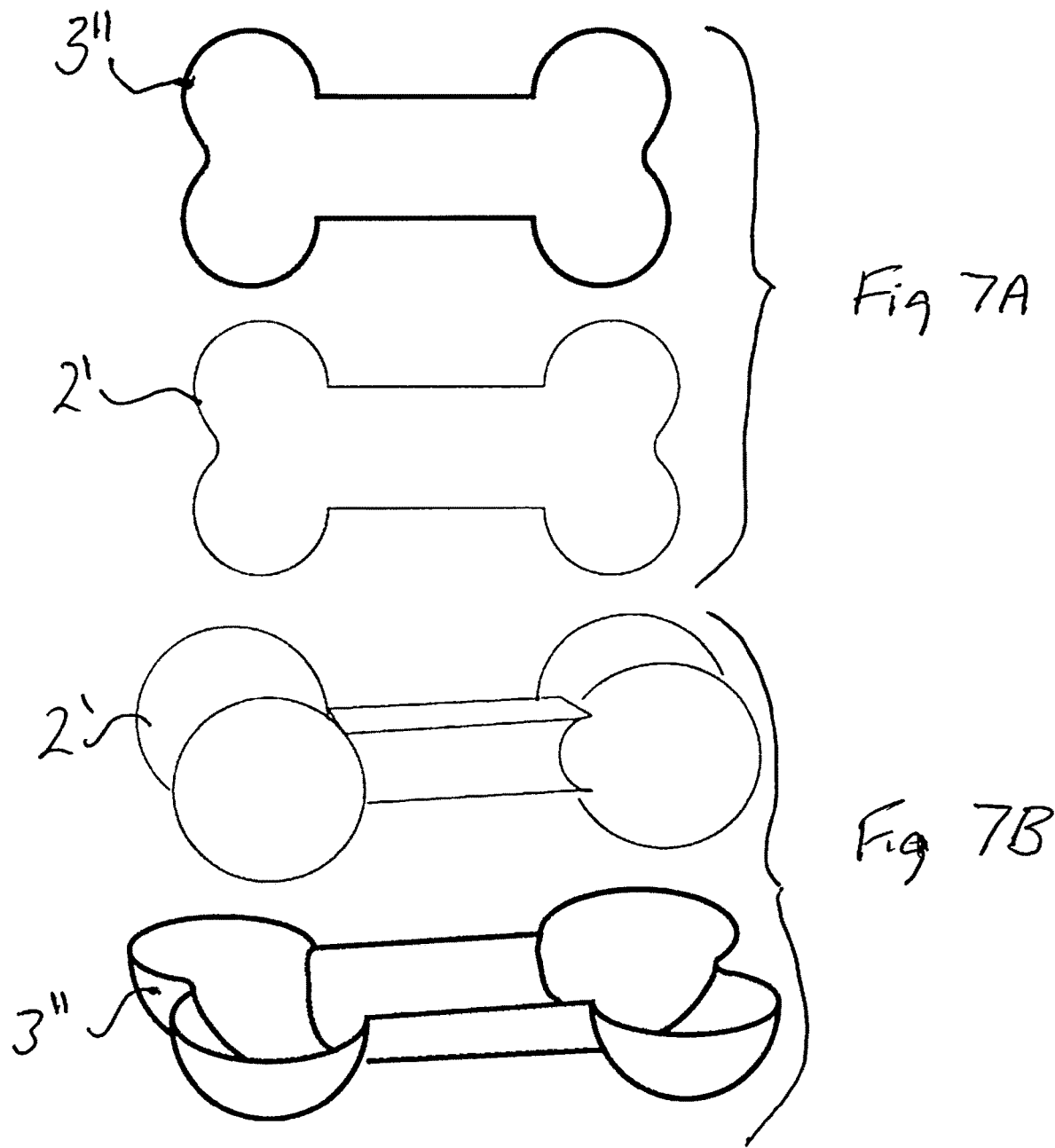

PLAY BALL WITH FOAM FILLING

RELATED APPLICATION

This application is a divisional of my application Ser. No. 15/011,540 filed Jan. 30, 2016 which claims priority from my provisional application 62/212,357 filed Aug. 21, 2015, the disclosures of both applications being incorporated herein by reference

FIELD OF THE INVENTION

The invention relates to play balls and particularly, but not solely, to those similar to tennis balls.

BACKGROUND OF THE INVENTION

Many play or sports balls, such as tennis balls, are 'pressurized' by a gas filling and lose their bounce over time and use, as a result of the gas escaping from the ball shell.

Tennis balls are commonly made by adhering together respective rims of two molded rubber half shells; heating in a match mold to fuse the rims permanently together as a unitary member; injecting air or gas under pressure; gluing two (dumb-bell shape) felt pieces to the exterior in covering relation, applying heat fusible tape along a seam between the felt pieces; and, reheating in a match mold to fuse the tape with the adjacent edges of the felt pieces.

There have been numerous prior attempts over many years to perfect ball structures to obviate or reduce such disadvantageous loss of bounce, for example by so-called pressureless ball structures. One such approach dispenses with the traditional (rubber) shell or hollow core entirely, relying instead on a solid core of a resilient foam composition. Another approach teaches a pressureless ball made by replacing/augmenting the rubber of the shell or hollow core with more durable/resilient compositions. In a further approach, a resiliently compressible foam core fills the shell by continued expansion within the shell itself.

SUMMARY OF THE INVENTION

One object of the invention is to provide a play ball of equivalent bounce to traditional, pressurized balls but with increased bounce duration and effective life without significant increase in weight, by filling the traditional rubber shell with resiliently compressible foam which is attached to the entire inside surface of the shell.

According to the invention, a play ball comprises an elastomeric (e.g. rubber) shell filled with a resiliently compressible foam body attached intimately over an entire peripheral surface thereof to an entire inside surface of the shell.

The attachment of the foam periphery to the shell interior enables the foam to provide additional resiliency by foam tension, in addition to resiliency by foam compression, thereby significantly extending the effective bounce life of the ball.

The attachment is preferably by both heat fusion of the contacting surfaces of the shell and foam filling and adhesive coated thereon.

In accordance with the invention, when the ball is of a tennis ball type, a pre-shaped/formed foam filling can be assembled with the molded rubber ball shell quite simply at an otherwise conventional stage in the manufacture of a tennis ball by confining the pre-shaped foam filling between two rubber half shells in compression, as a force-fit, and fusing the interior surface of the rubber shell to the foam periphery by heating such assembly in the same match mold that would otherwise be used during the conventional step of heat fusing together the rims of the half shells to make the tennis ball shell.

Preferably the foam body is coated with an adhesive prior to confinement in the shell thereby providing an additional retention force to the interior surface of the shell.

According to one aspect, the invention provides a method for making a play ball comprising the steps of:
  molding two, resiliently flexible, complementary half shells of rubber having engageable rims;
  providing a resiliently compressible foam body shaped to fill a shell assembled by engagement of said rims;
  assembling the half shells together enclosing the foam body by engaging said rims (to form a unitary member); and,
  fusing interior surfaces of the rubber half shells with the periphery of the foam body and fusing the rims together, as by heating the assembly (in a match mold).

Preferably, the method further comprises the step of maintaining the rims in engagement by the application of glue prior to the heating step.

Preferably, the foam is EVA or PU.

In a preferred aspect in which the play ball is a type of tennis ball, the method comprises the further steps of:
  subsequently adhering a bipartite, felt cover wrapping to the peripheral surface of the shell assembly with an elongate seam extending between adjacent respective edge portions of the respective parts;
  adhering a heat fuseable (polymer) tape along the seam; and
  fusing the tape into respective adjacent edges of the felt by heating in a match mold so that shrinkage of the tape on cooling draws together opposite edges of the respective parts together along the seam.

The additional resiliency provided by the foam filling facilitates manual application of the felt to the shell.

The rubber wall of the shell can have a thickness of 2 mm to 4 mm and the felt can have a thickness of between 50% and 100% of the thickness of the rubber wall of the shell.

According to a further aspect of the invention, a play ball comprising a resiliently flexible rubber shell having a filling of resilient foam with an outer periphery thereof attached around an interior surface of the shell.

The attachment of the foam to the shell interior enables the foam to provide additional resiliency, not only by compression of the foam but also by tension, significantly extending the effective bounce life of the play ball.

Preferably, the rubber is fused to the outer periphery of the foam by heating to provide the attachment.

Additionally, the invention provides a dog bouncing toy in which the shell of the play ball can have eccentric protuberances filled with the foam or formed by a localized increases in thickness of only a portion of the shell wall.

BRIEF DESCRIPTION OF THE DRAWINGS

A specific embodiment of the invention will now be described by way of example only and by reference to the accompanying drawings in which:

FIG. 6 is a photograph of a section sawn through the center of a similar unitary member but showing intimate attachment of the filling body only by fusion to the interior surfaces of the shell (i.e. adhesive omitted);

FIGS. 7A and 7B are diagrammatic plan and perspective views, respectively, of a dog chew toy comprising a bone-shape half shell and correspondingly shaped EVA foam shaped to fill the half shell.

PARTICULAR EMBODIMENT

Figure 1:
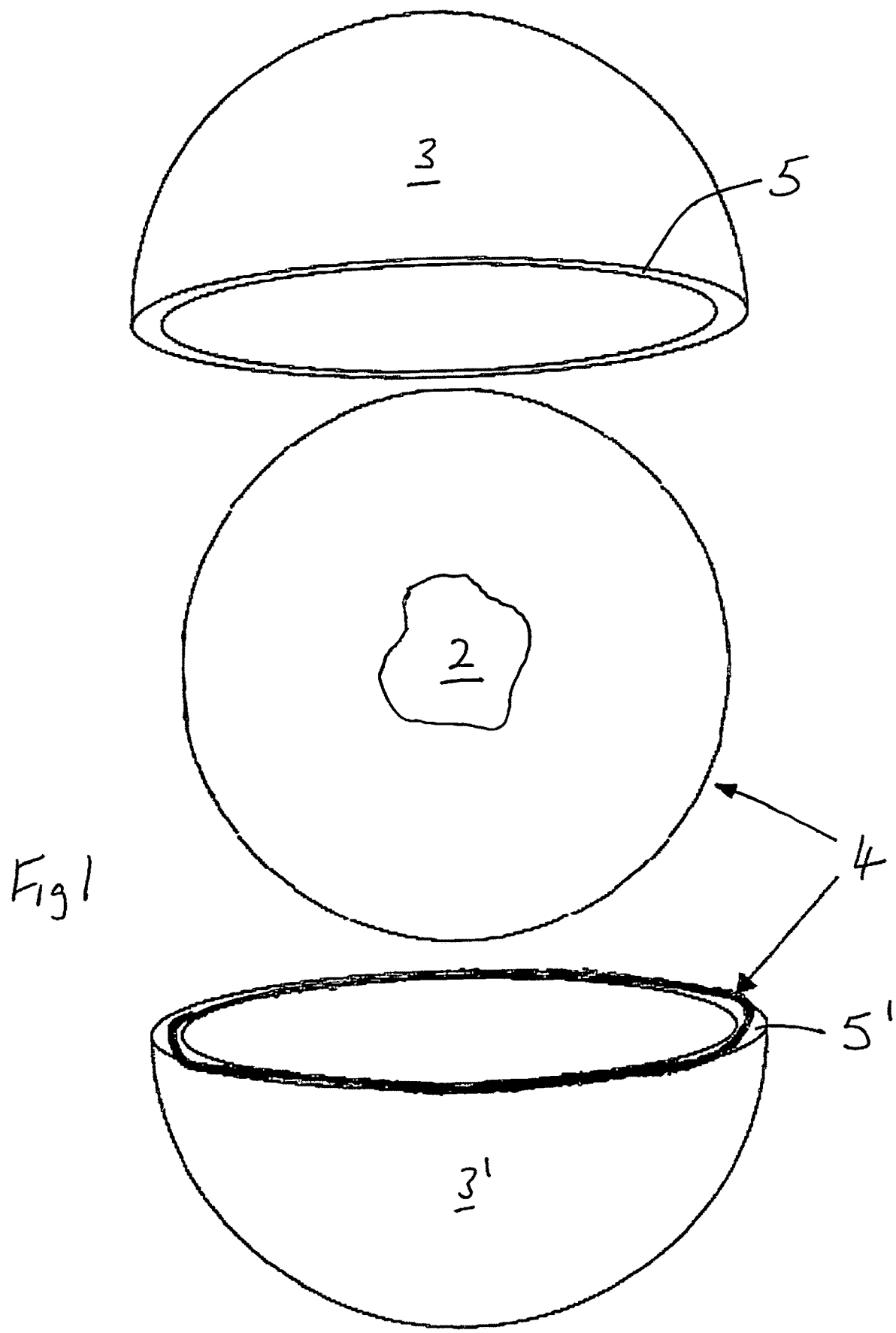
FIG. 1 is a diagrammatic view of a resiliently compressible, adhesive coated, foam core, aligned between upper and lower half shells for placement in the lower shell and assembly of the rubber half shells together by engagement of their rims to form a unitary member, the lower rim having a coating of adhesive.
Figure 2:
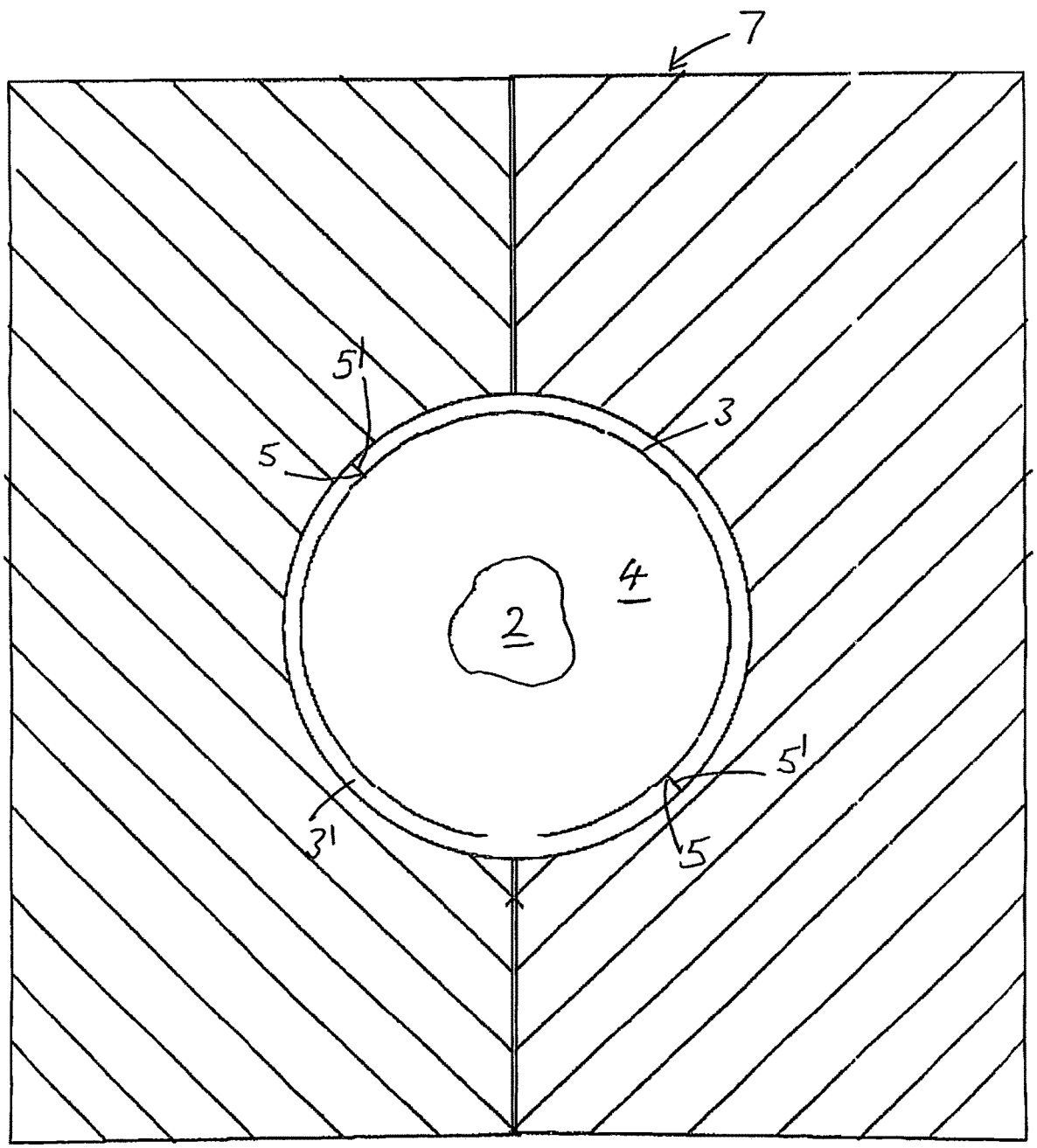
FIG. 2 is a diagrammatic section showing the unitary member being heated in a match mold for heat fusing the inner surfaces of the half shells to the outer periphery of the foam heat and for fusing the rims together to form a permanent unitary member.
Figure 3:
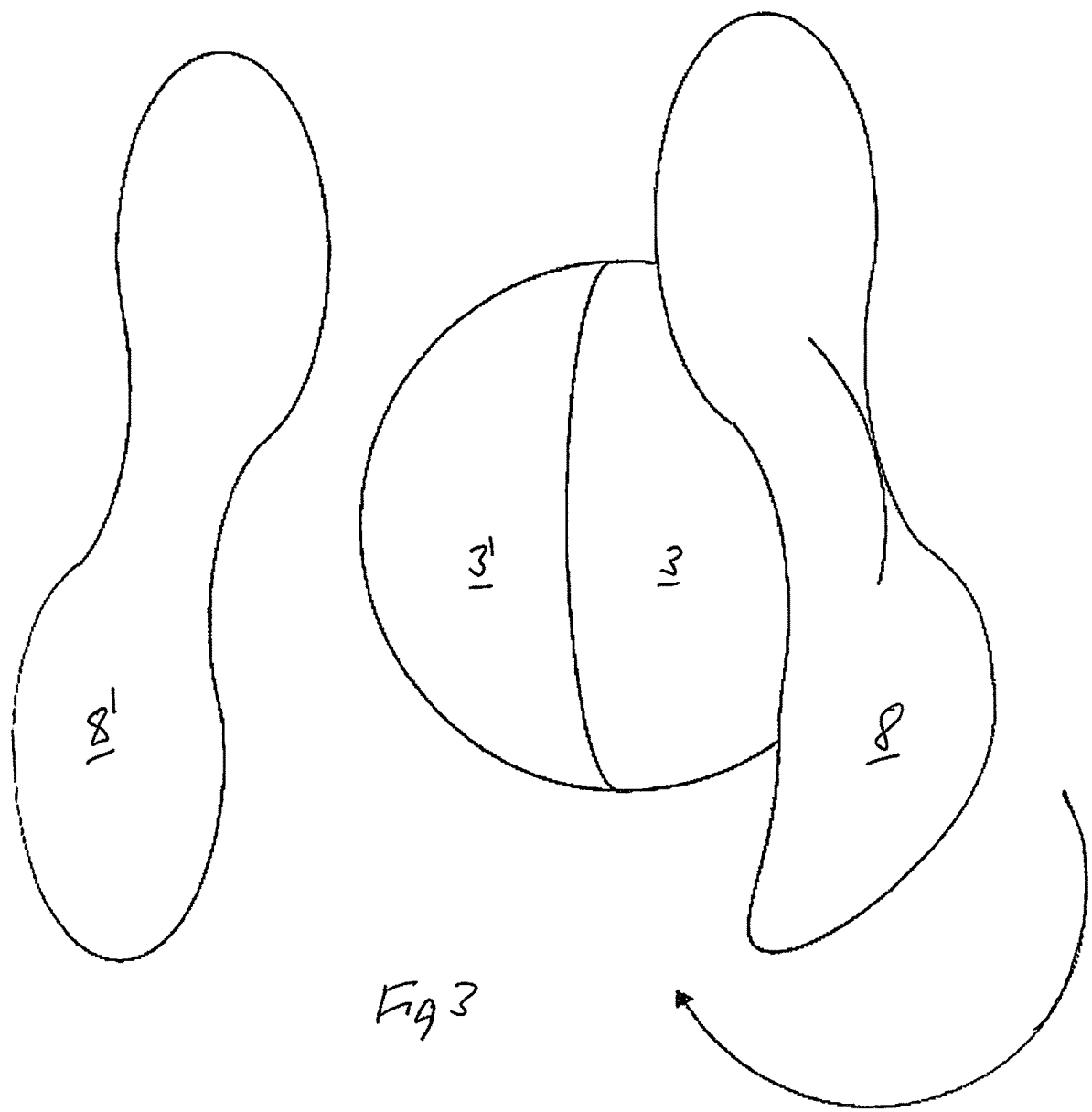
FIG. 3 is a diagrammatic view showing wrapping the two pieces of tennis ball felt to the surface of the unitary member.
Figure 4:
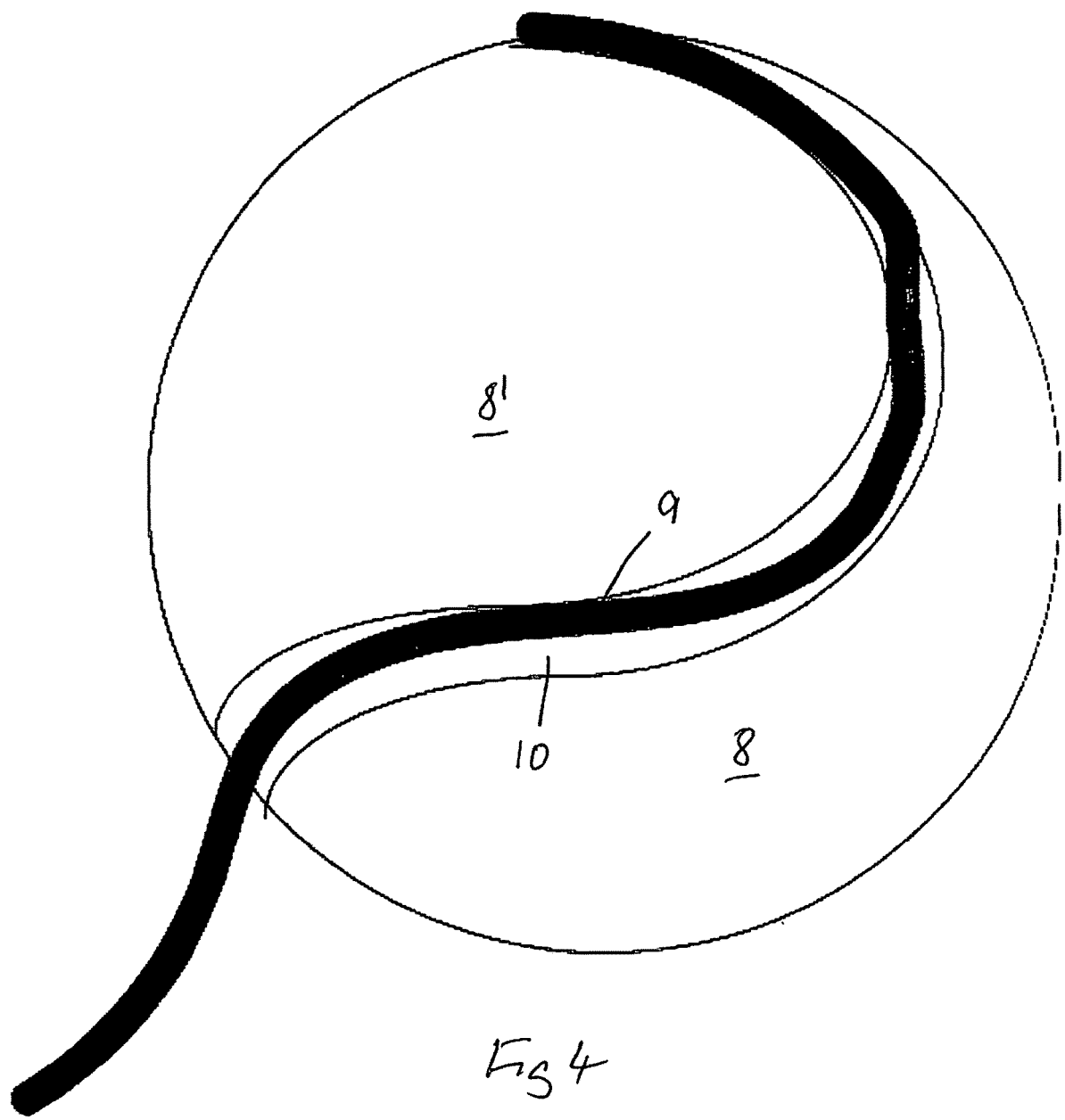
FIG. 4 is a diagrammatic view showing a polymer tape being applied along the seams between the two pieces of felt; and, FIG. 5 is a diagrammatic section showing the felt and tape covered unitary member being heated in a match mold to fuse the tape to opposed edges of the felt pieces.
Figure 5:
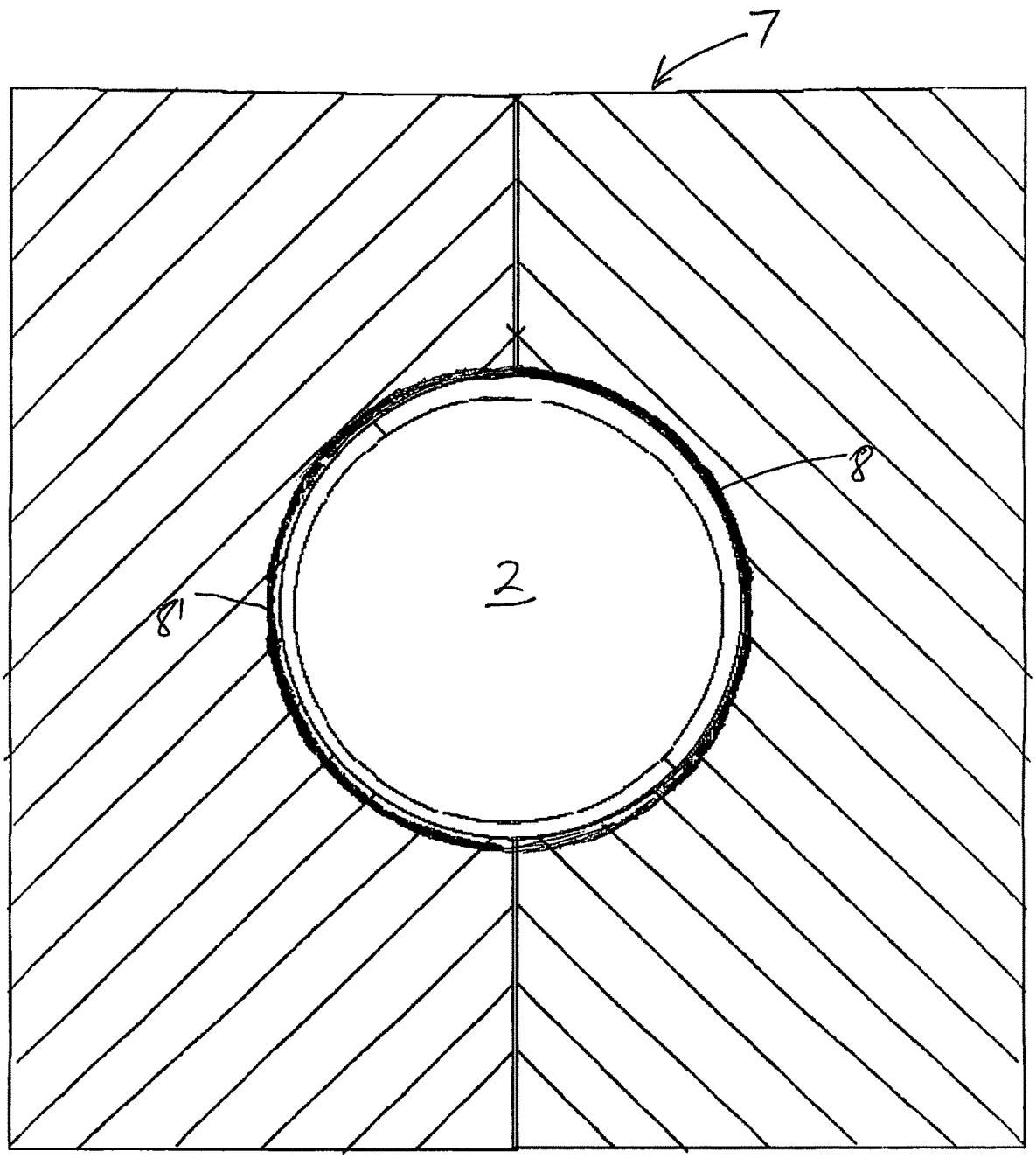

Referring particularly to FIGS. 1 and 2, a unitary, spherical, fully expanded, filling body of EVA 2 foam, (diameter 67 mm.), molded to match the interior surfaces of upper and lower, molded, hemispherical rubber half shells 3, 3' (diameter 64 mm) as a force fit, has the entire periphery coated (by tumbling) with RTV adhesive 4, The adhesive coated foam body is then (manually) force fitted into the lower half shell 3', which has a bead of the same adhesive 4 applied around the rim 5, and, the upper half shell then force fitted onto the exposed portion of the filling body such that rims 5', 5 of respective half shells are retained engaged together, confining the filling 2 in resiliently compressed condition between them to temporarily form a unitary member. The unitary member is then placed in a match mold 7, as shown in FIG. 2, and heated to 150 degrees F. which ensures that not only the rims are fused permanently engaged together, but also fuses the entire inner surfaces of the rubber half shells to the periphery of the filling body, reinforced by the adhesive, As shown in FIG. 3, a pair of conventional, adhesive backed, felt pieces 8, 8' of dumb bell shape to cover the entire surface of the unitary member are then wrapped in conventional fashion around respective half shells to extend over the other half shell and a polymer tape 9 adhered along a seam 10 between the felt pieces in known manner. The assembly so formed is then heated in a match mold to fuse the tape with the adjacent edge portions of the felt so that the shrinkage of the tape on cooling draws the felt edges together, tightening the wrapping.

Additional exemplary diameters of the sizes of the foam and shell are 45 mm and 38 mm, respectively.

The rubber wall of the shell has a thickness of 2 mm to 4 mm and the felt has a thickness of between 50% and 100% of the thickness of the rubber wall of the shell.

The invention provides a particularly durable dog toy as the additional retention/pulling force provided by the intimate attachment of the foam filling 2' to the shell 3" structure largely prevents popping of the shell seams and the shell itself during chewing. Forming the toy in the shape of a traditional bone, as shown in FIGS. 7A and 7B, adds to the amusement. Traditional tennis ball type felt can be adhered to the exterior to provide a desirably 'plush' look and feel.

The invention claimed is:

1. A play ball comprising a resiliently flexible elastomeric shell having a filling of resilient foam with an entire outer peripheral surface thereof intimately attached to an entire interior surface of the shell; wherein the play ball is a tennis ball, the elastomeric shell has a rubber wall having a thickness of 2 mm to 4 mm and the peripheral surface of the shell is wrapped by a bipartite, felt cover having a thickness of between 50% and 100% of the thickness of the rubber wall of the shell and with an elongate seam extending between adjacent respective edge portions of the respective parts which are sealed together by an overlying ribbon under tension.

2. A play ball according to claim 1 wherein the entire outer peripheral surface of the foam filling adheres to the entire interior surface of the shell to provide at least part of the attachment.

3. A play ball according to claim 1 wherein the entire outer peripheral surface of the foam filling fuses to the entire interior surface of the shell to provide at least part of the attachment.

4. A play ball according to claim 1 wherein the foam is EVA.

5. A play ball comprising a resiliently flexible elastomeric shell having a filling of resilient foam with an entire outer peripheral surface thereof intimately attached to an entire interior surface of the shell; wherein the play ball is a tennis ball, and the entire outer peripheral surface of the foam filling fuses and adheres to the entire interior surface of the shell to provide at least part of the attachment, the elastomeric shell has a rubber wall having a thickness of 2 mm to 4 mm and the peripheral surface of the shell is wrapped by a bipartite, felt cover having a thickness of between 50% and 100% of the thickness of the rubber wall of the shell and with an elongate seam extending between adjacent respective edge portions of the respective parts which are sealed together by an overlying ribbon under tension.

6. A play ball according to claim 5 wherein the foam is EVA.

7. A play ball comprising a resiliently flexible elastomeric shell having a filling of resilient foam with an entire outer peripheral surface thereof intimately attached to an entire interior surface of the shell, wherein the shell of the play, ball has eccentric external protuberances filled with the foam to provide an irregular bounce for a dog toy, the eccentric external protuberances being formed by uneven wall thicknesses.

8. A play ball according to claim 7 wherein the entire outer peripheral surface of the foam filling adheres to the entire interior surface of the shell to provide at least part of the attachment.

9. A play ball according to claim 7 wherein the entire outer peripheral surface of the foam filling fuses to the entire interior surface of the shell to provide at least part of the attachment.

10. A play ball according to claim 7 wherein the foam is EVA.

* * * * *